(12) United States Patent
Nishiyama

(10) Patent No.: US 11,678,184 B2
(45) Date of Patent: *Jun. 13, 2023

(54) COMMUNICATION APPARATUS AND COMMUNICATION METHOD

(71) Applicant: TOYOTA JIDOSHA KABUSHIKI KAISHA, Toyota (JP)

(72) Inventor: Shigeki Nishiyama, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/518,007

(22) Filed: Nov. 3, 2021

(65) Prior Publication Data
US 2022/0060895 A1 Feb. 24, 2022

Related U.S. Application Data

(63) Continuation of application No. 17/070,510, filed on Oct. 14, 2020, now Pat. No. 11,206,536, which is a (Continued)

(30) Foreign Application Priority Data

May 18, 2018 (JP) .............................. JP2018-096226

(51) Int. Cl.
*H04N 5/44* (2011.01)
*H04W 12/06* (2021.01)
(Continued)

(52) U.S. Cl.
CPC ........... *H04W 12/06* (2013.01); *B60R 25/003* (2013.01); *B60R 25/1001* (2013.01);
(Continued)

(58) Field of Classification Search
CPC ..... H04W 12/06; H04W 12/64; H04W 12/63; B60R 25/003; B60R 25/1001;
(Continued)

(56) References Cited

U.S. PATENT DOCUMENTS

2009/0243791 A1 10/2009 Partin et al.
2010/0050713 A1 3/2010 Nagao et al.
(Continued)

FOREIGN PATENT DOCUMENTS

JP 2009-094767 A 4/2009
JP 2010-059650 A 3/2010
(Continued)

OTHER PUBLICATIONS

Jul. 15, 2020 Notice of Allowance Issued in U.S. Appl. No. 16/382,284.
Feb. 20, 2020 Office Action Issued in U.S. Appl. No. 16/382,284.

*Primary Examiner* — Munear T Akki
(74) *Attorney, Agent, or Firm* — Oliff PLC

(57) ABSTRACT

A communication apparatus executes authentication via wireless communication with a mobile device and, based on an authentication process, controls execution of a vehicle operation requested by a user. The communication apparatus includes a detection unit configured to detect closure of a door of a vehicle, an authentication processing unit configured to determine, in response to detection of the closure of the door by the detection unit, whether a specific mobile device is inside the vehicle by executing a first authentication process corresponding to a vehicle operation for which a highest security is set, among a plurality of vehicle operations that can be requested by the user, and an execution unit configured to execute, when the authentication processing unit has determined that the specific mobile device is inside the vehicle, a requested vehicle operation
(Continued)

requestable from an inside of the vehicle and included in the plurality of vehicle operations.

20 Claims, 3 Drawing Sheets

Related U.S. Application Data continuation of application No. 16/382,284, filed on Apr. 12, 2019, now Pat. No. 10,841,796.

(51) Int. Cl.
 *B60R 25/00* (2013.01)
 *G07C 9/00* (2020.01)
 *B60R 25/10* (2013.01)
 *H04W 12/64* (2021.01)

(52) U.S. Cl.
 CPC ........ *G07C 9/00174* (2013.01); *H04W 12/64* (2021.01); *G07C 2009/00793* (2013.01)

(58) Field of Classification Search
 CPC ... B60R 25/24; B60R 25/246; G07C 9/00174; G07C 2009/00793; G07C 9/00309; G07C 2209/63
 See application file for complete search history.

(56) References Cited

U.S. PATENT DOCUMENTS

| | | |
|---|---|---|
| 2011/0068895 A1 | 3/2011 | Gee et al. |
| 2016/0005250 A1* | 1/2016 | Inoue ................. E05B 47/0001 701/2 |
| 2017/0247918 A1* | 8/2017 | Oomi ...................... B60R 25/24 |
| 2017/0298659 A1* | 10/2017 | Watanabe .......... G07C 9/00309 |
| 2017/0327086 A1 | 11/2017 | Katou |
| 2018/0106882 A1* | 4/2018 | Kanaga ................... G01S 11/06 |
| 2019/0219678 A1* | 7/2019 | Miyazawa .............. E05B 49/00 |

FOREIGN PATENT DOCUMENTS

| | | |
|---|---|---|
| JP | 2014-091434 A | 5/2014 |
| JP | 2016-108826 A | 6/2016 |

* cited by examiner

COMMUNICATION APPARATUS AND COMMUNICATION METHOD

INCORPORATION BY REFERENCE

This is a Continuation of U.S. application Ser. No. 17/070,510 filed Oct. 14, 2020, which is a Continuation of U.S. application Ser. No. 16/382,284 filed Apr. 12, 2019, which claims the benefit of Japanese Priority Application No. 2018-096226 filed May 18, 2018. The disclosure of each of the prior applications is hereby incorporated by reference herein in its entirety.

BACKGROUND

1. Technical Field

The present disclosure relates to a communication apparatus mounted on a vehicle and configured to execute an authentication process via wireless communication with a mobile device, and a communication method using the communication apparatus.

2. Description of Related Art

Japanese Unexamined Patent Application Publication No. 2016-108826 (JP 2016-108826 A) discloses an electronic key system that controls locking and unlocking of a door via wireless communication between an in-vehicle apparatus and a mobile device. The electronic key system disclosed in JP 2016-108826 A is provided with a first channel, and a second channel having a carrier frequency different from that of the first channel and a bit rate higher than that of the first channel. A receiver of the in-vehicle apparatus restrains a crosstalk of an operation signal and a response signal, by receiving, on the first channel, the operation signal transmitted from the mobile device based on the fact that an operation unit of the mobile device has been operated, and by receiving, on the second channel, the response signal transmitted from the mobile device in response to a request signal transmitted from the in-vehicle apparatus. In addition, in the electronic key system, responsiveness of the response signal is improved by setting the bit rate of the second channel to be higher than that of the first channel.

SUMMARY

A purpose of the electronic key system disclosed in JP 2016-108826 A is to improve responsiveness by increasing a bit rate. However, since increasing the bit rate degrades noise resistance, there is a limit to improving the responsiveness by increasing the bit rate.

It is therefore conceivable that the responsiveness to a request to execute an operation that does not require high security is improved, by making the content of an authentication process to be executed when an operation requiring high security, such as starting up a vehicle, is requested different from the content of an authentication process to be executed when an operation not necessarily requiring high security, such as locking a vehicle door, is requested.

However, even though the content of the authentication process to be executed when an operation not requiring high security is requested is made different from the content of the authentication process to be executed when an operation requiring high security is requested, when the authentication process is executed every time an operation of the vehicle is requested by a user, responsiveness to the user's request declines due to a time loss caused by the authentication process.

The present disclosure provides a communication apparatus and a communication method that, when a vehicle operation is requested by the user, can improve responsiveness to the request for the vehicle operation, while ensuring security.

A communication apparatus according to a first aspect of the present disclosure executes authentication via wireless communication with a mobile device, and, based on an authentication result, controls execution of a vehicle operation requested by a user. The communication apparatus includes a detection unit configured to detect closure of a door of a vehicle, an authentication processing unit configured to determine, in response to detection of the closure of the door of the vehicle by the detection unit, whether a specific mobile device is inside the vehicle by executing a first authentication process corresponding to a vehicle operation for which the highest security is set, among a plurality of vehicle operations that can be requested by the user, and an execution unit configured to execute, when the authentication processing unit determines that the specific mobile device is inside the vehicle, a requested vehicle operation that can be requested from an inside of the vehicle and that is included in the plurality of vehicle operations.

The communication apparatus according to the first aspect of the present disclosure executes, in response to detection of the closure of the door of the vehicle, the first authentication process to determine whether it is possible to execute the vehicle operation for which the highest security is set, and determines by the first authentication process whether the specific mobile device is inside the vehicle. When it is determined by the first authentication process that the specific mobile device is inside the vehicle, the communication apparatus applies a result of the first authentication process to any vehicle operation that can be requested from the inside of the vehicle, and executes the requested vehicle operation. In the communication apparatus, when it is determined by the first authentication process that the specific mobile device is inside the vehicle, since the authentication process is not required to be executed again when the vehicle operation is requested by the user, the responsiveness to the user's request is improved. In addition, since this control process is based on the first authentication process corresponding to the vehicle operation for which the highest security is set, security can be ensured.

Further, the plurality of vehicle operations may include a door locking operation that locks the door of the vehicle from an outside of the vehicle. When it is determined by the first authentication process that the specific mobile device is not inside the vehicle and the door locking operation is requested, the authentication processing unit may determine whether the specific mobile device is outside the vehicle by executing a second authentication process different from the first authentication process. When it is determined by the second authentication process that the specific mobile device is outside the vehicle, the execution unit may execute the door locking operation for the vehicle.

With this configuration, when the door locking operation is requested and it is confirmed by the second authentication process that the specific mobile device is outside the vehicle, door locking can be executed such that the responsiveness to the request for the door locking operation is improved.

When it is determined by the first authentication process that the specific mobile device is inside the vehicle and the door locking operation is requested, the execution unit may output an alarm.

With this configuration, since it is determined by the first authentication process that the mobile device is inside the vehicle, the user can be notified, by an alarm such as a buzzer, that the mobile device is left in the vehicle.

Moreover, the plurality of vehicle operations may include a vehicle start-up operation that starts up the vehicle based on an operation of a start-up switch of the vehicle. When it is determined by the first authentication process that the specific mobile device is inside the vehicle and the vehicle start-up operation is requested, the execution unit may execute the vehicle start-up operation according to the operation of the start-up switch of the vehicle, without executing an additional process.

With this configuration, when it is determined by the first authentication process that the specific mobile device is inside the vehicle, it is possible to start up the vehicle with good responsiveness to the request for the vehicle start-up operation.

When it is determined by the first authentication process that the specific mobile device is not inside the vehicle and the vehicle start-up operation is requested, the execution unit may output an alarm.

With this configuration, since it is determined by the first authentication process that the specific mobile device is not inside the vehicle, the user can be notified, by an alarm such as a buzzer, of a possibility that an unauthorized start-up operation is being requested.

A communication method according to a second aspect of the present disclosure, by a communication apparatus, executes authentication via wireless communication with a mobile device, and, based on an authentication result, controls execution of a vehicle operation requested by a user. The communication method includes a step of detecting the closure of a door of a vehicle, a step of determining whether a specific mobile device is inside the vehicle by executing, in response to detection of the closure of the door of the vehicle, the first authentication process corresponding a vehicle operation for which a highest security is set, among a plurality of vehicle operations that can be requested by the user, and a step of executing a requested vehicle operation that can be requested from the inside of the vehicle and that is included in the plurality of vehicle operations when it is determined by the first authentication process that the specific mobile device is inside the vehicle.

The plurality of vehicle operations may include the door locking operation that locks the door of the vehicle from the outside of the vehicle. The communication method may further include a step of determining whether the specific mobile device is outside the vehicle by executing a second authentication process different from the first authentication process when it is determined by the first authentication process that the specific mobile device is not inside the vehicle and the door locking operation is requested, and a step of executing the door locking operation of the vehicle when it is determined by the second authentication process that the specific mobile device is outside the vehicle.

The communication method may further include outputting an alarm when it is determined by the first authentication process that the specific mobile device is inside the vehicle and the door locking operation is requested.

The plurality of vehicle operations may include a vehicle start-up operation that starts up the vehicle based on an operation of a start-up switch of the vehicle. The communication method may further include a step of executing the vehicle start-up operation without executing an additional process when it is determined by the first authentication process that the specific mobile device is inside the vehicle and the vehicle start-up operation is requested.

The communication method may further include a step of outputting an alarm when it is determined by the first authentication process that the specific mobile device is not inside the vehicle and the vehicle start-up operation is requested.

With each aspect of the present disclosure, it is possible to provide a communication apparatus and a communication method that can ensure security and improve responsiveness to a request for a vehicle operation, when the vehicle operation is requested by a user.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Overview

A communication system according to an embodiment of the present disclosure determines whether an authorized mobile device is inside a vehicle, by executing, in response to detection of closure of a door of the vehicle, a first authentication process for a vehicle operation for which a highest security is set (for example, a vehicle start-up operation). When it is determined by the first authentication process that the authorized mobile device is inside the vehicle and a vehicle operation is requested, the communication system executes the requested vehicle operation without executing the authentication process again. Since the authentication process is not executed again when the vehicle operation is requested, responsiveness to the request for the vehicle operation can be improved.

Embodiments

Configuration

Figure 1:
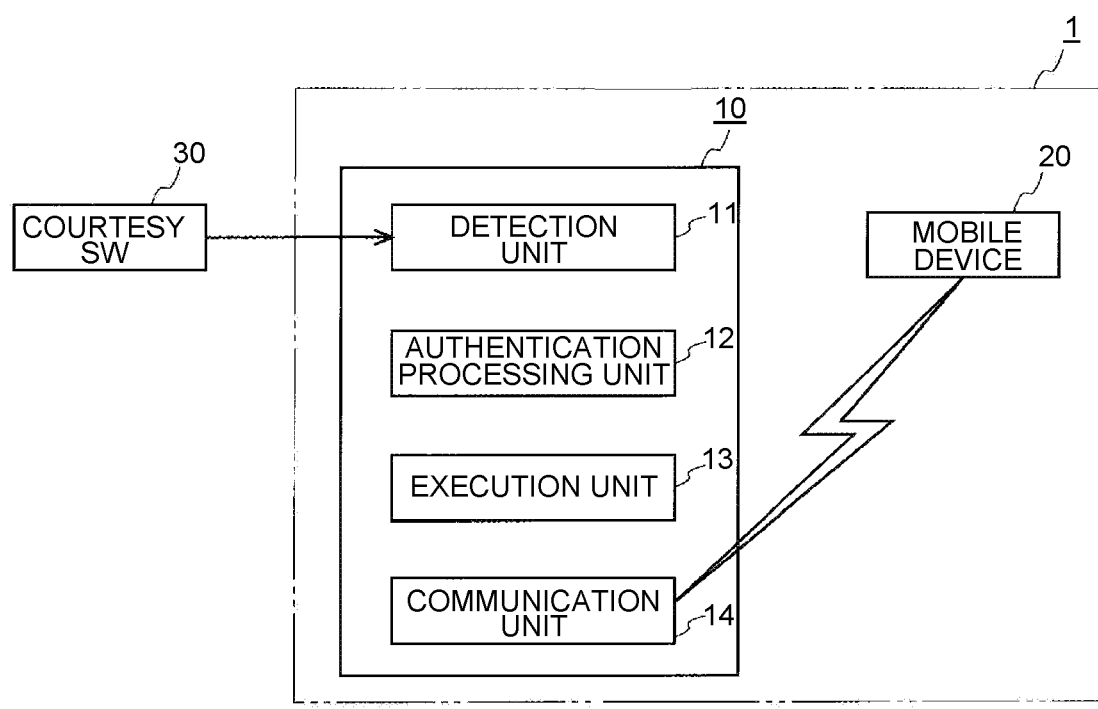
FIG. 1 is a functional block diagram of a communication system according to an embodiment of the present disclosure.

FIG. 1 is a diagram illustrating functional blocks of a communication system according to the embodiment.

The communication system 1 includes a communication apparatus 10 mounted on a vehicle, and a mobile device 20 carried by a user. The communication system 1 is, for example, an electronic key system installed in the vehicle. The communication apparatus 10 authenticates that the mobile device 20 is an authorized mobile device by executing wireless communication with the mobile device 20 and, based on an authentication result, controls execution of a requested vehicle operation.

The communication apparatus 10 includes a detection unit 11, an authentication processing unit 12, an execution unit 13, and a communication unit 14.

The detection unit 11 detects the closure of the door of the vehicle. In the present embodiment, based on an output signal of a courtesy switch 30 (courtesy SW) provided near each door of the vehicle and configured to detect an open-closed state of the door, the detection unit 11 detects a change in the state of the door from an open state to a closed state. The switch used as the courtesy switch 30 is, for example, a switch having a contact point that is open when the door is in a closed state and closed when the door is in an open state. Instead of using the courtesy switch 30, the detection unit 11 may detect the closure of the door of the vehicle based on an output of another control device, such as a body control Electronic Control Unit (ECU) that monitors whether the door is in an open or closed state based on the courtesy switch 30.

The authentication processing unit 12 executes authentication of the mobile device 20 by communicating with the mobile device 20 via the communication unit 14 which will be described below. The authentication processing unit 12 can execute at least the first authentication process and a second authentication process as processes to authenticate whether the mobile device 20 is authorized.

The first authentication process is an authentication process which is executed when a vehicle operation for which the highest security is set is requested among a plurality of vehicle operations that can be executed based on a request from a user carrying the mobile device 20. The vehicle operation for which the highest security is set is a vehicle operation that may lead to an unauthorized use of the vehicle if an unauthorized user is permitted to execute the vehicle operation. Examples of the vehicle operation for which the highest security is set include a start-up of the vehicle based on an operation of a start-up switch of the vehicle, or door unlocking from an outside of the vehicle. Therefore, a highly reliable authentication method that makes tampering and impersonation difficult is employed for the first authentication process.

The second authentication process is a process with the main purpose of identifying the mobile device 20, and is executed when a vehicle operation, which has a low possibility to lead to an unauthorized use of the vehicle, is requested.

Both the first authentication process and the second authentication process are executed based on information included in a response signal output from the mobile device 20 in response to an output signal (request signal) from the communication apparatus 10, and include at least a process of checking unique identification information held by the mobile device 20. As described above, the first authentication process is executed when the vehicle operation that may lead to an unauthorized use of the vehicle (for example, starting up the vehicle or door unlocking from the outside of the vehicle) is requested. For this reason, the first authentication process employs an authentication sequence that, although requiring a processing time longer than the second authentication process, is highly reliable. A method of making the reliability of the first authentication process higher than that of the second authentication process is not particularly limited, but may include, in addition to checking unique identification information held by the mobile device 20, a method of making the number of communications between the communication apparatus 10 and the mobile device 20 in the first authentication process higher than the number of communications therebetween in the second authentication process, a method of including information in which forgery or impersonation is difficult in the information transmitted and received between the communication apparatus 10 and the mobile device 20, a method of making a frequency band that is used for a communication between the communication apparatus 10 and the mobile device 20 in the first authentication process different from a frequency band that is used in the second authentication process, a method of making an encryption strength in the first authentication process higher than that in the second authentication process, and a method of using a communication with another communication apparatus, such as a smart phone, in conjunction with the communication between the communication apparatus 10 and the mobile device 20. By combining the above methods, the reliability of the first authentication process may be improved.

The authentication processing unit 12 executes the first authentication process when the closure of the door of the vehicle is detected by the detection unit 11. Examples of the operation that is assumed to be requested by a user after the door of the vehicle is closed include an operation that can be requested from an inside of the vehicle, such as starting up the vehicle by operating the start-up switch of the vehicle or changing the seat position or meter color, and an operation that can be requested from the outside of the vehicle, such as door locking. In the present embodiment, when the closure of the door of the vehicle is detected, the authentication processing unit 12 executes the first authentication process associated with the vehicle operation for which the highest security is set, in consideration of the possibility that the user gets in the vehicle and executes the operation of starting up the vehicle, for which the highest security is set. By executing the first authentication process, the authentication processing unit 12 determines whether the authorized mobile device 20 is inside the vehicle. Further, when a specific vehicle operation such as a door locking operation is requested from the outside of the vehicle, the authentication processing unit 12 determines whether the authorized mobile device 20 is outside the vehicle by executing the second authentication process.

The execution unit 13 controls execution of the vehicle operation requested by the user based on the result of the authentication process by the authentication processing unit 12. When the authentication processing unit 12 determines by the first authentication process that the authorized mobile device 20 is inside the vehicle, the execution unit 13 executes the requested vehicle operation no matter which vehicle operation among the plurality of vehicle operations that can be requested by the user from the inside of the vehicle is requested. For example, when it is determined by the first authentication process that the authorized mobile device 20 is inside the vehicle and the user requests starting up of the vehicle by operating the start-up switch, the execution unit 13 requests a control device that controls the operation of the vehicle, such as an engine ECU or an electric vehicle (EV) control ECU, to start up the vehicle without any additional processing such as another authentication process by the authentication processing unit 12. Moreover, when it is determined by the first authentication process that the authorized mobile device 20 is inside the vehicle and a vehicle operation that does not require high security such as changing a setting (for example, the seat position or meter color) that is changeable for each user or outputting operation advice is requested, the execution unit 13 executes such a vehicle operation based on the result of the first authentication process. In addition, when it is determined by the first authentication process that the authorized mobile device 20 is not inside the vehicle, even though a vehicle operation is requested from the inside of the vehicle, the execution unit 13 does not execute the requested vehicle operation, and outputs an alarm or the like.

Further, when the authentication processing unit 12 determines by the first authentication process that the authorized mobile device 20 is not inside the vehicle and a vehicle operation that does not require high security such as the door locking operation is requested, the execution unit 13 executes the requested vehicle operation on condition that it is determined by the second authentication process that the authorized mobile device 20 is outside the vehicle. For example, when the user alights from the vehicle while carrying the mobile device 20 and closes the door, it is determined that the authorized mobile device 20 is not inside the vehicle by executing the first authentication process in response to the closure of the door of the vehicle. In this case, when door locking is requested by the user's touching of the door handle, or the like, and it is determined by the second authentication process of the authentication processing unit 12 that the authorized mobile device 20 is outside the vehicle, the execution unit 13 requests a control device that controls locking and unlocking of the door, such as a body control ECU, or the like, to execute door locking. In addition, when it is determined by the second authentication process that the authorized mobile device 20 is not outside the vehicle, even though a vehicle operation is requested from the outside of the vehicle, the execution unit 13 does not execute the requested vehicle operation.

The communication unit 14 includes one or more transmitters that transmit a radio signal, one or more receivers that receive a radio signal, and one or more antennas (an indoor antenna and an outdoor antenna). The communication unit 14 transmits and receives the radio signal to and from the mobile device 20 based on a request from the authentication processing unit 12. When a mobile communication terminal different from the mobile device 20 is used in the first authentication process, the communication unit 14 is installed with a transmitter, a receiver, and an antenna of a communication system corresponding to the used mobile communication terminal.

Similar to the communication unit 14, the mobile device 20 includes a transmitter that transmits the radio signal, a receiver that receives the radio signal, and an antenna. The mobile device 20 transmits and receives the radio signal to and from the communication unit 14.

The communication unit 14 and the mobile device 20 can transmit and receive, for example, an LF signal and an RF signal. The communication unit 14 and the mobile device 20 can execute a part or all of the above-described communication in the first authentication process and the second authentication process, by combining the LF signal transmission and reception and the RF signal transmission and reception.

Control Process

Hereinafter, control process of the communication apparatus according to the embodiment will be described with reference to FIG. 1 to FIG. 3.

Figure 2:
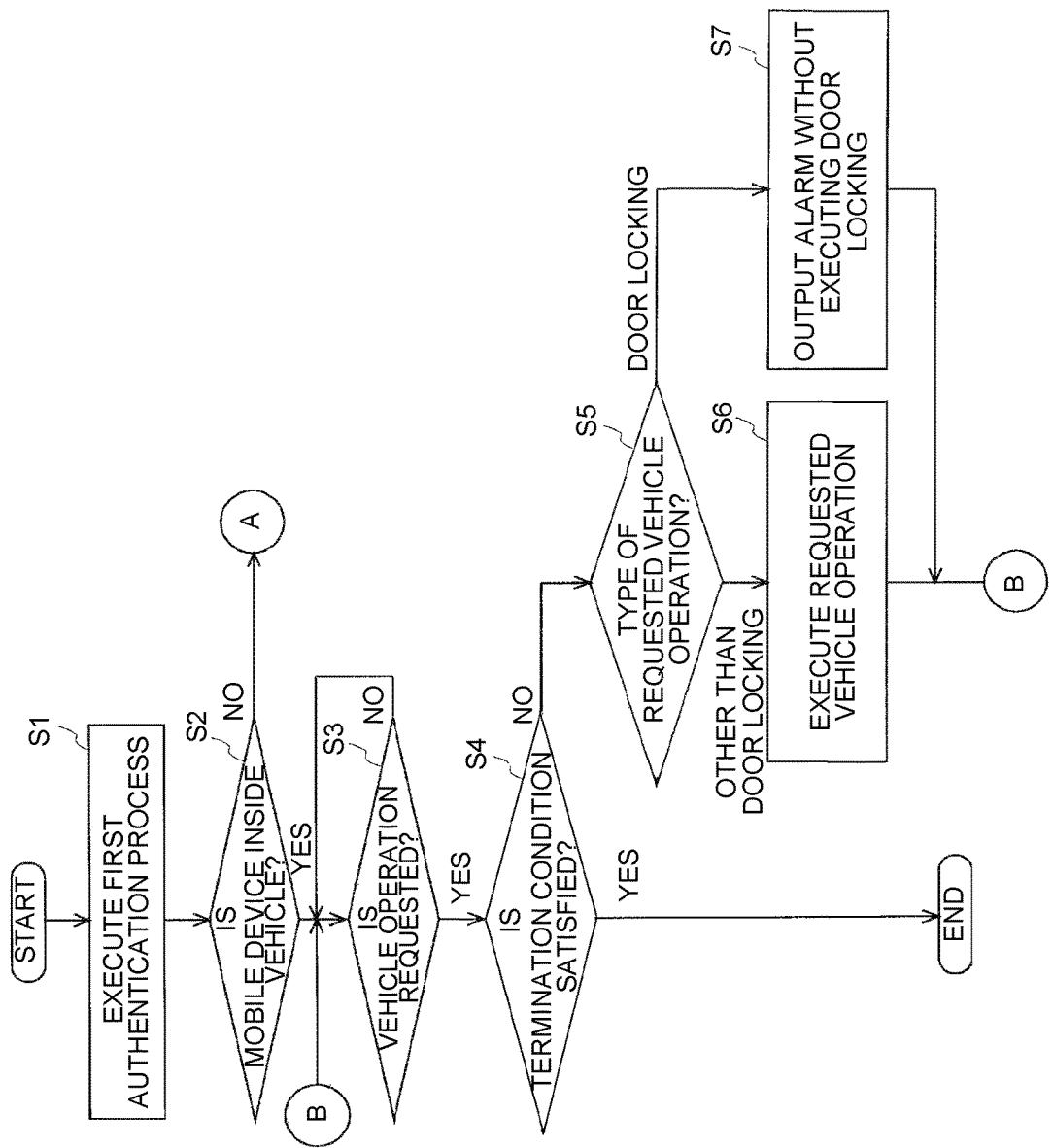
FIG. 2 is a flowchart illustrating an example of a control process executed by a communication apparatus illustrated in FIG. 1.
Figure 3:
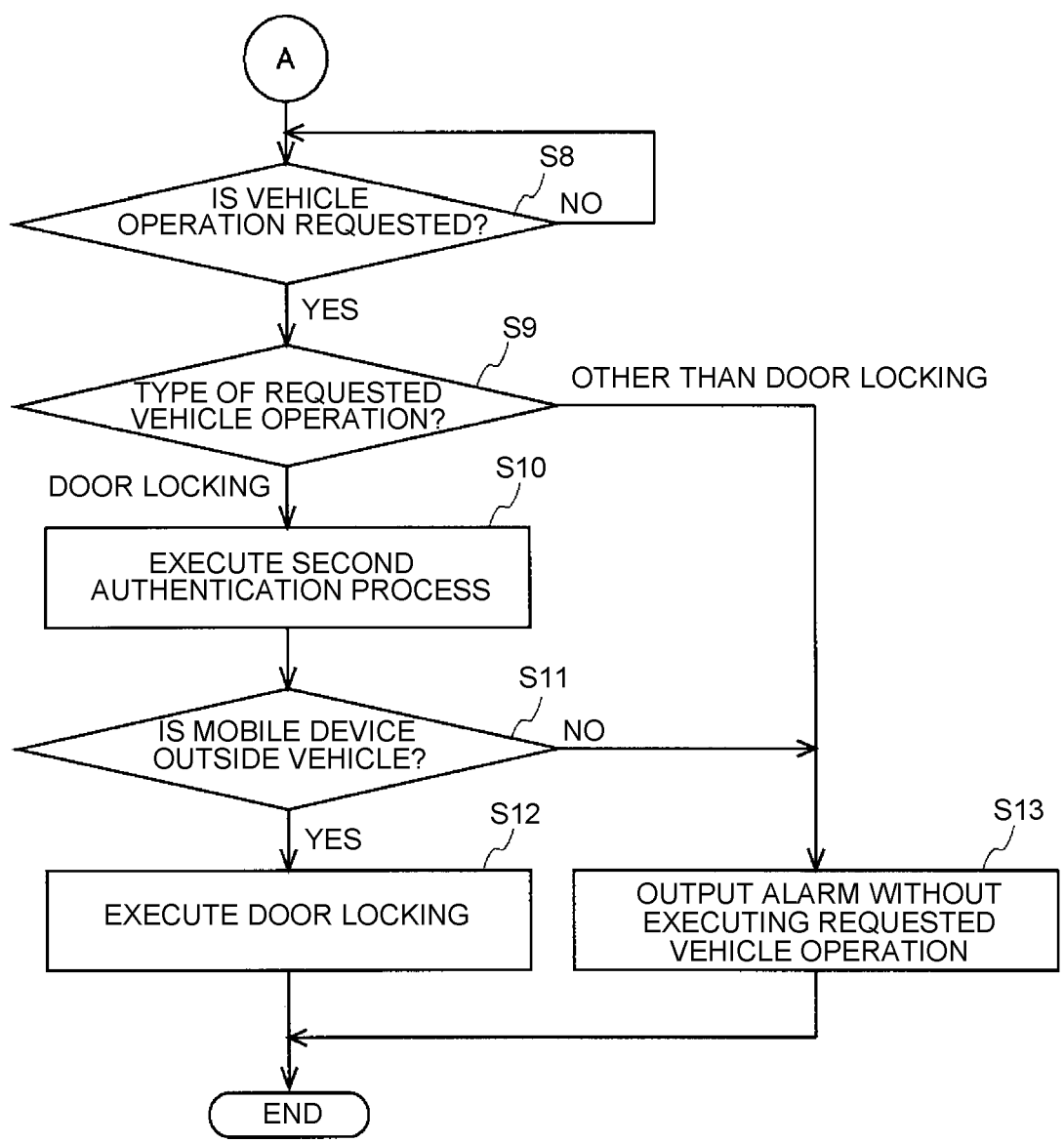
FIG. 3 is a flowchart illustrating an example of a part of a control process continued from the control process illustrated in FIG. 2.

FIG. 2 and FIG. 3 are flowcharts illustrating an exemplified control process executed by the communication apparatus 10 illustrated in FIG. 1. The control process illustrated in FIG. 2 and FIG. 3 is initiated in response to detection, by the detection unit 11, of the closure of the door of the vehicle.

Step S1: when the detection unit 11 detects the closure of the door of the vehicle, the authentication processing unit 12 executes the first authentication process via the communication unit 14. Thereafter, the process proceeds to step S2.

Step S2: the authentication processing unit 12 determines whether an authorized mobile device 20 is inside the vehicle based on the result of the first authentication process. When the determination in step S2 is YES, the process proceeds to step S3, and when the determination is other than YES, the process proceeds to step S8 in FIG. 3.

Step S3: the execution unit 13 determines whether a vehicle operation has been requested. When the determination in step S3 is YES, the process proceeds to step S4, and when the determination is other than YES, the determination in step S3 is executed again.

Step S4: the execution unit 13 determines whether a termination condition of the control process illustrated in FIG. 2 and FIG. 3 is satisfied. The termination condition is a condition which, after it is determined in step S2 that the authorized mobile device 20 is inside the vehicle and the requested vehicle operation is allowed to be executed based on the determination result, invalidates the use of the determination result. For example, when the determination result is only valid for a predetermined time after it is determined by the first authentication process that the authorized mobile device 20 is inside the vehicle, the execution unit 13 determines that the termination condition is satisfied in step S4, when the predetermined time has passed after the result of the determination in step S2 is determined to be YES. Moreover, instead of, or in addition to, setting a valid period of the determination result of the first authentication process, a state change of any door of the vehicle may be set as the termination condition. Specifically, when the detection unit 11 determines that any door of the vehicle has changed from a closed state to an open state, the execution unit 13 determines that the termination condition is satisfied. When the determination in step S4 is YES, the process is terminated, and when the determination is other than YES, the process proceeds to step S5.

Step S5: the execution unit 13 determines a type of the vehicle operation which has been requested in step S3. When the vehicle operation which has been requested is other than the door locking operation, the process proceeds to step S6, and when the vehicle operation which has been requested is the door locking operation, the process proceeds to step S7.

Step S6: the execution unit 13 executes the vehicle operation which has been requested in step S3. In addition, the execution unit 13 executes the process of step S6 when the authorized mobile device 20 is inside the vehicle and the door is in a closed state. Therefore, it is preferable that the vehicle operation that can be executed by the execution unit 13 in step S6 is a vehicle operation that can be requested from the inside of the vehicle. Thereafter, the process proceeds to step S3, and the processes of steps S3 to S5 described above are executed.

Step S7: the execution unit 13 outputs an alarm without executing the vehicle operation which has been requested in step S3, i.e., the door locking operation requested from the outside of the vehicle. The execution unit 13 executes the process of step S7 when the authorized mobile device 20 is inside the vehicle and door locking is requested. Accordingly, in step S7, the execution unit 13 outputs an alarm and notifies the user that the mobile device 20 is inside the vehicle. Thereafter, the process proceeds to step S3, and the processes of steps S3 to S5 described above are executed.

Step S8: the execution unit 13 determines whether the vehicle operation has been requested. When the determination in step S8 is YES, the process proceeds to step S9, and when the determination is other than YES, the determination in step S8 is executed again.

Step S9: the execution unit 13 determines the type of the vehicle operation which has been requested in step S8. When the vehicle operation which has been requested is door locking, the execution unit 13 requests the authentication processing unit 12 to execute the second authentication process. Thereafter, the process proceeds to step S10. Meanwhile, when the vehicle operation which has been requested is other than door locking, the process proceeds to step S13.

Step S10: the authentication processing unit 12 executes the second authentication process via the communication unit 14. Thereafter, the process proceeds to step S11.

Step S11: the authentication processing unit 12 determines whether the authorized mobile device 20 is outside the vehicle based on the result of the second authentication process. When the determination in step S11 is YES, the process proceeds to step S12, and when the determination is other than YES, the process proceeds to step S13.

Step S12: the execution unit 13 executes the door locking operation which has been requested in step S8. Thereafter, the process is terminated.

Step S13: the execution unit 13 outputs an alarm without executing the vehicle operation which has been requested in step S8. For example, when starting up the vehicle is requested in step S8, the execution unit 13 does not start up the vehicle, and outputs an alarm, thereby preventing an unauthorized use of the vehicle. Thereafter, the process is terminated.

Advantageous Effects and Others

The communication apparatus 10 according to the present embodiment uses the first authentication process, which is executed, in response to the closure of the door of the vehicle, when a vehicle operation for which the highest security is set, such as the start-up of the vehicle, is requested to determine whether the authorized mobile device 20 is inside the vehicle. When it is determined by the first authentication process that the authorized mobile device 20 is inside the vehicle, based on the determination result, the execution unit 13 executes the requested vehicle operation, no matter which vehicle operation that can be requested from the inside of the vehicle is requested. Accordingly, when it is confirmed by the first authentication process that the authorized mobile device 20 is inside the vehicle, since a re-authentication process which is required when a vehicle operation is requested becomes unnecessary, the responsiveness to the request for the vehicle operation can be improved. Further, the communication apparatus 10 according to the present embodiment confirms that the authorized mobile device 20 is inside the vehicle by the first authentication process which has a relatively high reliability and is executed in response to the closure of the door of the vehicle. Therefore, even though the requested vehicle operation is starting up of the vehicle, for which the highest security is set, the vehicle can be started up without executing the re-authentication process.

When a specific vehicle operation is requested from the outside of the vehicle (for example, door locking from the outside of the vehicle) after it has been determined by executing, in response to the closure of the door of the vehicle, the first authentication process that the authorized mobile device 20 is not inside the vehicle, the communication apparatus 10 according to the present embodiment determines whether the authorized mobile device 20 is outside the vehicle by executing the second authentication process. When it is confirmed by the second authentication process that the authorized mobile device 20 is outside the vehicle, the communication apparatus 10 executes the specific vehicle operation (for example, door locking from the outside of the vehicle). In general, when door locking is requested from the outside of the vehicle, a process of confirming that the mobile device 20 is not inside the vehicle and a process of confirming that the mobile device 20 is outside the vehicle are executed in order to determine the position of the mobile device 20 with high accuracy. When the user carrying the mobile device 20 alights from the vehicle and closes the door, the communication apparatus 10 according to the present embodiment confirms that the authorized mobile device 20 is not inside the vehicle, through the first authentication process that is executed in response to the closure of the door of the vehicle. Accordingly, when door locking is requested from the outside of the vehicle, the determination result that the authorized mobile device 20 is not inside the vehicle is used, and it is confirmed by the second authentication process that the authorized mobile device 20 is outside the vehicle. Therefore, the communication apparatus 10 according to the present embodiment can improve responsiveness to a request for a specific vehicle operation from the outside of the vehicle (i.e., reduce a time between when the specific vehicle operation is requested from the outside of the vehicle and when the specific vehicle operation is executed). When a vehicle operation that does not require high security, such as door locking from the outside of the vehicle, is requested, the communication apparatus 10 according to the present embodiment executes door locking on condition that the authorized mobile device 20 is identified by the second authentication process, which has a relatively short processing time, which makes it possible to improve the responsiveness.

As described above, when it is determined by executing, in response to the closure of the door, the first authentication process that the authorized mobile device 20 is inside the vehicle, the communication apparatus 10 according to the present embodiment executes the requested vehicle operation without the re-authentication process when the vehicle operation is requested by the user. Moreover, when a specific vehicle operation is requested from the outside of the vehicle after it has been determined by executing, in response to the closure of the door, the first authentication process that the authorized mobile device 20 is not inside the vehicle, the communication apparatus 10 according to the present embodiment executes the requested vehicle operation when it is confirmed by the second authentication process, that the authorized mobile device 20 is outside the vehicle. Therefore, the communication apparatus 10 of the present embodiment can improve the responsiveness to a request to execute the vehicle operation (that is, reduce a time between when the vehicle operation is requested and when the vehicle operation is executed, in both the case in which a vehicle operation that can be requested from the inside of the vehicle is requested, and the case in which a specific vehicle operation is requested from the outside of the vehicle. Specifically, the communication apparatus 10 according to the present embodiment can shorten the time from the request for the vehicle operation to the execution of the vehicle operation by hundreds of milliseconds, by executing, in response to the closure of the door, the first authentication process in advance compared to the case in which the authentication process is executed after the request for the vehicle operation. To further restrain an unauthorized use of the vehicle, it is required to further improve the reliability of the first authentication process. However, in this case, a time required for a communication or process is expected to increase even longer. Even when the time required to execute the first authentication process is increased, the communication apparatus 10 according to the present embodiment exhibits sufficient responsiveness to a request for a vehicle operation.

Further, when it is determined, by executing, in response to the closure of the door, the first authentication process that the authorized mobile device 20 is inside the vehicle, the certainty that the authorized mobile device 20 is inside the vehicle may be improved by confirming that the authorized mobile device 20 is not outside the vehicle by additionally executing the second authentication process.

Moreover, in the above embodiment, an example in which the communication apparatus 10 determines whether the authorized mobile device 20 is inside the vehicle by executing, in response to detection of the closure of the door of the vehicle, the first authentication process with a relatively high reliability is described. However, when it is required to determine that the authorized mobile device 20 is outside the vehicle, such as when unlocking of the vehicle door is requested, whether the authorized mobile device 20 is outside the vehicle can be determined by executing the first authentication process, in response to detection of entry of the authorized mobile device 20 into a communication area of the communication apparatus 10, which is an area outside a vehicle cabin. Whether the authorized mobile device 20 entered the communication area of the communication apparatus 10 outside the vehicle cabin can be determined based on whether a response signal has been transmitted from the mobile device 20 in response to a polling signal output by the communication apparatus 10. Alternatively, assuming the door of the vehicle is unlocked, whether the authorized mobile device 20 is outside the vehicle may be determined by executing the first authentication process in response to a touch operation of a door handle or an operation of an operation unit of the mobile device 20. Further, when settlement process is possible via an information terminal in the vehicle, the first authentication process can be used to determine whether a request for the settlement process has been made by an authorized user.

The present disclosure can be used for a communication apparatus mounted on a vehicle to authenticate the mobile device, an electronic key system using the communication apparatus, and the like.

What is claimed is:

1. A communication apparatus configured to execute authentication via wireless communication with a mobile device, and, based on an authentication result, control execution of a vehicle operation requested by a user, the communication apparatus comprising:
   a processor that is configured to:
      detect closure of a door of a vehicle;
      determine, if the closure of the door of the vehicle is detected, whether the mobile device is inside the vehicle by executing a first authentication process via wireless communication;
      determine whether the mobile device is outside the vehicle by executing a second authentication process different from the first authentication via wireless communication if (i) the first authentication process determines that the mobile device is not inside the vehicle and (ii) a door locking operation is requested; and
      execute the door locking operation for the vehicle if the second authentication process determines that the mobile device is outside the vehicle.

2. The communication apparatus according to claim 1, wherein the first authentication process includes checking first identification information stored in the mobile device.

3. The communication apparatus according to claim 1, wherein the second authentication process includes checking second identification information stored in the mobile device.

4. The communication apparatus according to claim 1, wherein
   the processor is configured to execute the first authentication process based on information included in a response signal output from the mobile device in response to a request signal.

5. The communication apparatus according to claim 1, further comprising:
   a communication unit configured to wirelessly transmit and receive a radio signal to and from the mobile device, wherein
   a first number of communications between the communication unit and the mobile device in the first authentication process is higher than a second number of communications between the communication unit and the mobile device in the second authentication process.

6. The communication apparatus according to claim 1, further comprising:
   a communication unit configured to wirelessly transmit and receive a radio signal to and from the mobile device, wherein
   a first frequency band that is used for communication between the communication unit and the mobile device in the first authentication process is different from a second frequency band that is used for communication between the communication unit and the mobile device in the second authentication process.

7. The communication apparatus according to claim 1, wherein
   a first encryption strength used in the first authentication process is higher than a second encryption strength used in the second authentication process.

8. The communication apparatus according to claim 1, wherein
   the first authentication process includes a first communication between the mobile device and the processor and a second communication between another mobile device and the processor.

9. The communication apparatus according to claim 1, wherein
   when the door locking operation is requested from outside of the vehicle, the processor is further configured to not execute the door locking operation for the vehicle in response to a determination by the first authentication process that the mobile device is inside the vehicle.

10. The communication apparatus according to claim 9, wherein
    the processor is further configured to output an alarm in response to the determination by the first authentication process that the mobile device is inside the vehicle.

11. The communication apparatus according to claim 9, wherein
    the processor is further configured to notify the user that the mobile device is inside of the vehicle in response to the determination by the first authentication process that the mobile device is inside the vehicle.

12. The communication apparatus according to claim 1, wherein
    when the door locking operation is requested from outside of the vehicle, the processor is further configured to not execute the door locking operation for the vehicle if the second authentication process determines that the mobile device is not outside the vehicle.

13. The communication apparatus according to claim 12, wherein
the processor is further configured to output an alarm in response to the determination by the second authentication process that the mobile device is not outside the vehicle.

14. The communication apparatus according to claim 1, wherein
the first authentication process is completed before the door locking operation is requested.

15. The communication apparatus according to claim 1, wherein
the processor is further configured to not execute the door locking operation for the vehicle in response to a determination that any door of the vehicle is in an open state after receiving the door locking operation.

16. The communication apparatus according to claim 1, wherein
when the door locking operation is requested from inside of the vehicle, the processor is further configured to execute the door locking operation for the vehicle if the first authentication process determines that the mobile device is inside the vehicle.

17. The communication apparatus according to claim 1, wherein
the processor is further configured to execute the second authentication processing in response to a determination by the first authentication processing that the mobile device is inside of the vehicle.

18. The communication apparatus according to claim 1, wherein
the first authentication process and the second authentication process authenticate whether the mobile device is an authorized mobile device.

19. A communication method of executing authentication via wireless communication with a mobile device, and, based on an authentication result, controlling execution of a vehicle operation requested by a user, by a communication apparatus, the communication method comprising:
detecting closure of a door of a vehicle;
determining, if the closure of the door of the vehicle is detected, whether the mobile device is inside the vehicle by executing a first authentication process via wireless communication;
determining whether the mobile device is outside the vehicle by executing a second authentication process different from the first authentication process via wireless communication if (i) the first authentication process determines that the mobile device is not inside the vehicle and (ii) a door locking operation is requested; and
executing the door locking operation for the vehicle if the second authentication process determines that the mobile device is outside the vehicle.

20. A non-transitory storage medium storing instructions that are executable by one or more processors and that cause the one or more processors to perform functions comprising:
detecting closure of a door of a vehicle;
determining, if the closure of the door of the vehicle is detected, whether a mobile device is inside the vehicle by executing a first authentication process via wireless communication;
determining whether the mobile device is outside the vehicle by executing a second authentication process different from the first authentication process via wireless communication if (i) the first authentication process determines that the mobile device is not inside the vehicle and (ii) a door locking operation is requested; and
executing the door locking operation for the vehicle if the second authentication process determines that the mobile device is outside the vehicle.

* * * * *